(12) United States Patent
Lee

(10) Patent No.: US 10,191,151 B2
(45) Date of Patent: Jan. 29, 2019

(54) SYSTEM AND METHOD FOR MONITORING VESSEL TRAFFIC INFORMATION

(71) Applicant: ELECTRONICS AND TELECOMMUNICATIONS RESEARCH INSTITUTE, Daejeon (KR)

(72) Inventor: Byung Gil Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 120 days.

(21) Appl. No.: 15/257,905

(22) Filed: Sep. 6, 2016

(65) Prior Publication Data

US 2017/0356996 A1    Dec. 14, 2017

(30) Foreign Application Priority Data

Jun. 14, 2016  (KR) .................. 10-2016-0073851

(51) Int. Cl.
| | | |
|---|---|---|
| G01S 13/93 | (2006.01) | |
| G01S 7/24 | (2006.01) | |
| G01S 13/66 | (2006.01) | |
| H04W 4/02 | (2018.01) | |
| H04W 4/04 | (2009.01) | |

(Continued)

(52) U.S. Cl.
CPC .......... G01S 13/9307 (2013.01); G01S 7/003 (2013.01); G01S 7/064 (2013.01); G01S 7/12 (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 7,817,079 B1 | 10/2010 | Funk | |
| 2008/0304597 A1* | 12/2008 | Peach | G08G 3/02 |
| | | | 375/324 |
| 2012/0007750 A1* | 1/2012 | Gorabi | B63B 43/00 |
| | | | 340/984 |
| 2014/0022107 A1 | 1/2014 | Kim et al. | |
| 2015/0241560 A1 | 8/2015 | Lee et al. | |

FOREIGN PATENT DOCUMENTS

| | | |
|---|---|---|
| KR | 101131944 B1 | 3/2012 |
| KR | 10-2013-0003629 A | 1/2013 |

(Continued)

OTHER PUBLICATIONS

AIS information quality report, "AIS Information Quality Report", Region: HELCOM, 2011.*

(Continued)

*Primary Examiner* — Anne M Antonucci
*Assistant Examiner* — Renee LaRose
(74) *Attorney, Agent, or Firm* — Rabin & Berdo, P.C.

(57) ABSTRACT

The present disclosure relates to a system and a method for monitoring vessel traffic information. The system for monitoring vessel traffic information includes: an interlock device configure to adjust identification information of a wireless terminal included in a received message to correspond to an identification system of auto identification system (AIS) message and convert the received message into a AIS message type, when receiving a message including ship information from a wireless terminal of a ship located in at least one ship network; a merging device configure to merge the ship information included in the converted AIS message with radar image information; and a monitoring device configure to display merged monitoring information on a monitoring screen.

20 Claims, 6 Drawing Sheets

(51) Int. Cl.
  *G01S 7/00* (2006.01)
  *G01S 7/06* (2006.01)
  *G01S 7/12* (2006.01)
  *G01S 7/22* (2006.01)
  *G01S 13/72* (2006.01)
  *G01S 13/86* (2006.01)
  *G01S 13/91* (2006.01)
  *H04W 24/08* (2009.01)
  *H04W 88/02* (2009.01)

(52) U.S. Cl.
  CPC ..................................... *G01S 7/22* (2013.01); *G01S 7/24* (2013.01); *G01S 13/66* (2013.01); *G01S 13/726* (2013.01); *G01S 13/867* (2013.01); *G01S 13/91* (2013.01); *H04W 4/026* (2013.01); *H04W 4/046* (2013.01); *H04W 24/08* (2013.01); *H04W 88/02* (2013.01)

(56) References Cited

FOREIGN PATENT DOCUMENTS

| KR | 10-2014-0048547 A | 4/2014 |
| KR | 10-2014-0085782 A | 7/2014 |
| KR | 1020150073278 A | 7/2015 |
| KR | 10-2015-0112253 A | 10/2015 |

OTHER PUBLICATIONS

Liu Chang et al., "Study of Data Fusion of AIS and Radar", 2009 International Conference of Soft Computing and Pattern Recognition, pp. 674-677, Dec. 4-7, 2009.

Byung-Gil Lee et al., "Design of situation awareness and aids to navigation structure of VTS for maritime safety," Journal of Korean Institute of Communications and Information Sciences, vol. 35 No. 7, pp. 1073-1080, Jul. 2010.

\* cited by examiner

FIG. 2

| 1 | 2 | 3 | 4 | 5 | 6 | 7 | 8 | 9 | 10 | 11 | 12 | ... | 23 | 24 |
|---|---|---|---|---|---|---|---|---|----|----|----|-----|----|----|
| ID FOR EACH EQUIPMENT (4 bit) | | | | CLASSIFIED BY MARITIME POLICE (6 bit) | | | | | | SERIAL NUMBER (14 bit) | | | | |

SYSTEM AND METHOD FOR MONITORING VESSEL TRAFFIC INFORMATION

CROSS-REFERENCE TO RELATED APPLICATION

This application claims the benefit of priority to Korean Patent Application No. 10-2016-0073851, filed on Jun. 14, 2016 in the Korean Intellectual Property Office, the disclosure of which is incorporated herein in its entirety by reference.

BACKGROUND OF THE INVENTION

Field of the Invention

The present disclosure relates to a system and a method for monitoring vessel traffic information.

Description of the Related Art

A vessel traffic system (VTS) collects location, speed, and state information of a ship by using various sensors including a radar and an automatic identification system (AIS) so as to ensure safe sailing of the ship, and, based on these information, provides various services such as a wake monitor and an induction to safety course.

Ship information collected by using various sensors such as radar and the like should be merged exactly without mismatch between radar target information and the merged information should be provided to the VTS so as to accomplish an accurate recognition and rapid control for the vessel traffic situation.

In general, the VTS collects target information from the radar and the AIS respectively, processes the determination of inter-relationship between targets to determine whether the collected targets are the same target, and merge the target information for the same target to be shown on a monitoring screen.

Recently, however, a vessel-pass (V-Pass) network is built as a separate system, which causes a dual management due to a separate monitoring system so that a direct tracing and a merge processing with the radar and AIS-based monitoring system are not accomplished.

SUMMARY OF THE INVENTION

The present disclosure has been made in view of the above problems, and provides a system and a method for monitoring vessel traffic information capable of converting prescribed standard type information transmitted from a transmission wireless terminal of a ship efficiently into an automatic identification system (AIS) message type to enable to apply to a conventional monitoring system.

The present disclosure further provides a system and a method for monitoring vessel traffic information capable of integrally observing a ship location, additional information, and existing AIS information in a monitoring system and enabling to accomplish the tracking of a specific ship.

In accordance with an aspect of the present disclosure, a system for monitoring vessel traffic information includes: an interlock device configure to adjust identification information of a wireless terminal included in a received message to correspond to an identification system of auto identification system (AIS) message and convert the received message into a AIS message type, when receiving a message including ship information from a wireless terminal of a ship located in at least one ship network; a merging device configure to merge the ship information included in the converted AIS message with radar image information; and a monitoring device configure to display merged monitoring information on a monitoring screen. The interlock device adjusts the number of bits corresponding to the identification information of the wireless terminal of the ship included in the received message. The interlock device extracts information which can be mapped to the AIS message among ship information included in the received message when the message received from any one ship network is a location related message, and generates a dynamic message of the AIS message type by mapping the extracted information. The interlock device extracts at least one information from among ship speed, latitude, longitude, direction, and time included in the received message, and maps the extracted information to a parameter corresponding to speed, latitude, longitude, direction of stem, and time stamp of the AIS message. The interlock device generates a static message of the AIS message type based on a message ID of the AIS message, a user ID, and a ship name. The merging device merges at least one information among information collected by a radar, CCTV, a AIS network, and sensors of other sensor network with the ship information included in the AIS message generated by the interlock device. The monitoring device displays information merged by the merging device in a symbol form on the monitoring screen. The monitoring device compares a location and a speed of each symbol displayed on the monitoring screen, and determines a risk of ship. The monitoring device extracts identification information of ship and location information from among monitoring information and determines a location of a specific ship, and converts a latitude-longitude-height (LLH) coordinate into a coordinate on a radar center coordinate system by using determined location information. The monitoring device calculates a location of a ship that is a target on a radar tracking system by using a coordinate on a converted radar center coordinate system, a speed of ship, and course information, and automatically tracks a location of ship on the radar tracking system.

In accordance with another aspect of the present disclosure, a method for monitoring vessel traffic information includes: receiving a message including ship information from a wireless terminal of a ship located in at least one ship network, by an interlock device; adjusting identification information of a wireless terminal included in a received message to correspond to an identification system of auto identification system (AIS) message and converting the received message into a AIS message type, by the interlock device; merging the ship information included in the AIS message converted by the interlock device with radar image information, by a merging device; and displaying monitoring information merged by the merging device on a monitoring screen, by a monitoring device.

BRIEF DESCRIPTION OF THE DRAWINGS

The objects, features and advantages of the present disclosure will be more apparent from the following detailed description in conjunction with the accompanying drawings, in which:

FIG. 2 is a diagram illustrating an example of a data structure for a ship pass network message in a system for monitoring vessel traffic information according to an embodiment of the present disclosure;

DETAILED DESCRIPTION OF EXEMPLARY EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 1:
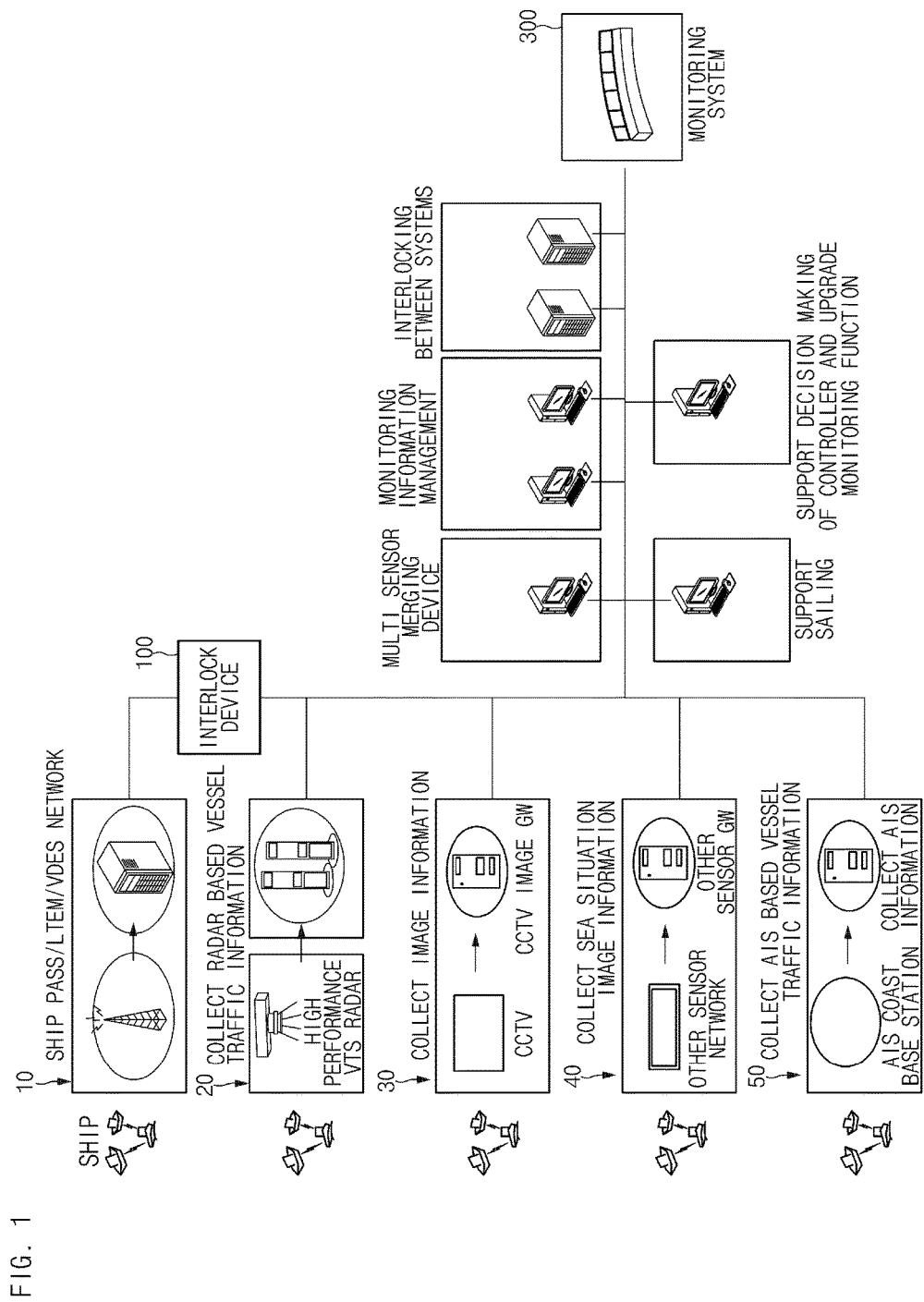
FIG. 1 is a diagram illustrating a configuration of a system for monitoring vessel traffic information according to an embodiment of the present disclosure.

FIG. 1 is a diagram illustrating a configuration of a vessel traffic system (VTS) according to an embodiment of the present disclosure.

Referring to FIG. 1, a ship network 10, for example, a wireless terminal for fishing mounted in a ship within a ship pass (V-Pass) network, a LTEm network, or a VDES network may periodically transmit information related to the location of the ship and the weather to a ground base station of a network to which a corresponding wireless terminal belongs. At this time, the ground base station in the ship network 10 may transmit location target information of ship transmitted by the wireless terminal of the ship to an interlock device 100.

In addition, information collected from a vessel traffic service (VTS) radar 20, a closed circuit television (CCTV) 30, sensors in other sensor network 40, and a AIS network 50 is also transmitted periodically to the interlock device 100.

At this time, the interlock device 100 may determine the suitability of the information contained in the message received from the ground base station, the VTS radar 20, the CCTV 30, the sensors in other sensor network 40, and the AIS network 50 to convert into a AIS message type.

For example, when receiving a message transmitted from the wireless terminal mounted in the ship of the ship pass network via the ground network, the interlock device 100 may convert data structure of received message into data structure of AIS message. In addition, the interlock device 100 may analyze the data structure of the message received via the LTEm or the VDES network to convert into the data structure of the AIS message. Thus, the interlock device may make it possible to merge and process the data from many communication networks by converting the received message into the data structure of the AIS message.

Hereinafter, an embodiment in the case of receiving the message from the ship pass networks is described.

An identification system in the message received from the wireless terminal in the ship pass network may be expressed as shown in FIG. 2.

As shown in FIG. 2, a message identification system of the ship pass network may be expressed as a total 24 bits. Here, information for identifying equipment, for example, identification (ID) information may be inserted to the upper 4 bits of the message identification system of the ship pass network.

For example, an ID of a ground wireless data communication equipment, an ID of a wireless data communication equipment for a sailing distance, or an ID of ship wireless terminal may be inserted to the upper 4 bits of the message identification system of the ship pass network.

As shown in the following Table 1, '0x1' may be inserted as an ID into the upper 4 bits in the ground wireless data communication equipment, and '0x2' may be inserted as an ID into the upper 4 bits in the wireless data communication equipment for a sailing distance. In addition, '0x3' may be inserted as an ID into the upper 4 bits in the ship wireless terminal.

TABLE 1

| Equipment | Upper 4 bits | Quantity |
| --- | --- | --- |
| Ground wireless data communication equipment | 0x1 | 1,048,575 |
| Wireless data communication equipment for a sailing distance | 0x2 | 1,048,575 |
| Ship wireless terminal | 0x3 | 1,048,575 |

In the data structure of the message in the ship pass network, information for identification by maritime police may be inserted into 6 bits after the upper 4 bits, and the remaining 14 bits may be configured by a serial number.

First, the data structure of the message received from the wireless terminal in the ship pass network may be expressed as shown in the following Table 2.

TABLE 2

| | Classification | Value | Content | Note |
| --- | --- | --- | --- | --- |
| Packet header | Command | 0x09 | Value of command | 1 Byte |
| | Data size | 0x10 | Data size | 1 Byte |
| | Encryption table index | En | ARIA encryption table index | 1 Byte (En <8) |
| Data | State | 0x70 | State information | 1 Byte |
| | Battery capacity | 0x64 | Percentage(%) | 1 Byte |
| | Longitude | 0x123456 | Longitude | 3 Byte |
| | Latitude | 0x123456 | Latitude | 1 Byte |
| | Speed | 0x00 | Knot unit | 1 Byte |
| | Direction | 0x00 | True: northwgs-84 | 1 Byte |
| | Time | 0x060905 | UTC | 3 Byte |
| | Filling gap | | Filling gap | 3 Byte (0xaa0x AA0xAA) |

As shown in Table 2, the data structure of the message of the ship pass network may be divided into a packet header area and a data area. First, a command, data size information, and an encryption table index may be inserted into the packet header area. In the packet header area, the command value of 1 Byte size, for example, '0x09' may be inserted and stored in the command area. In addition, the data size information of 1 Byte size, for example, '0x10' may be inserted and stored in the data size area. In addition, the ARIA encryption table index value of 1 Byte size, for example, En(En<8) may be inserted and stored in the encryption table index area.

Meanwhile, the state, the battery capacity, the longitude, the latitude, the speed, the direction, and the time information may be inserted into the data area. In the data area, the state information of 1 Byte size, for example, '0x70' may be inserted and stored in the state area. The remaining battery level (%) of 1 Byte size, for example, '0x64' may be inserted and stored in the battery capacity area. The longitude and latitude values of 3 Byte size may be inserted and stored in the longitude and latitude areas, for example, '0x123456' may be inserted and stored in the longitude and latitude areas. The speed value (knot) of 1 Byte size, for example, '0x00' may be inserted and stored in the speed area. The direction value of 1 Byte size may be inserted and stored in the direction area. Here, the direction value is a value based on World Geodetic System (WGS-84) which is a reference coordinate system that GPS uses, for example, '0x00' may be inserted and stored. The time value of 3 Byte size may be inserted and stored in the time area. Here, the time value is a value based on Universal Time Coordinated (UTC), for example, '0x060905' may be inserted and stored.

The interlock device 100 may identify the equipment ID from the message of the ship pass network, and may convert the message of the ship pass network into a message type of the AIS network.

Figure 3:
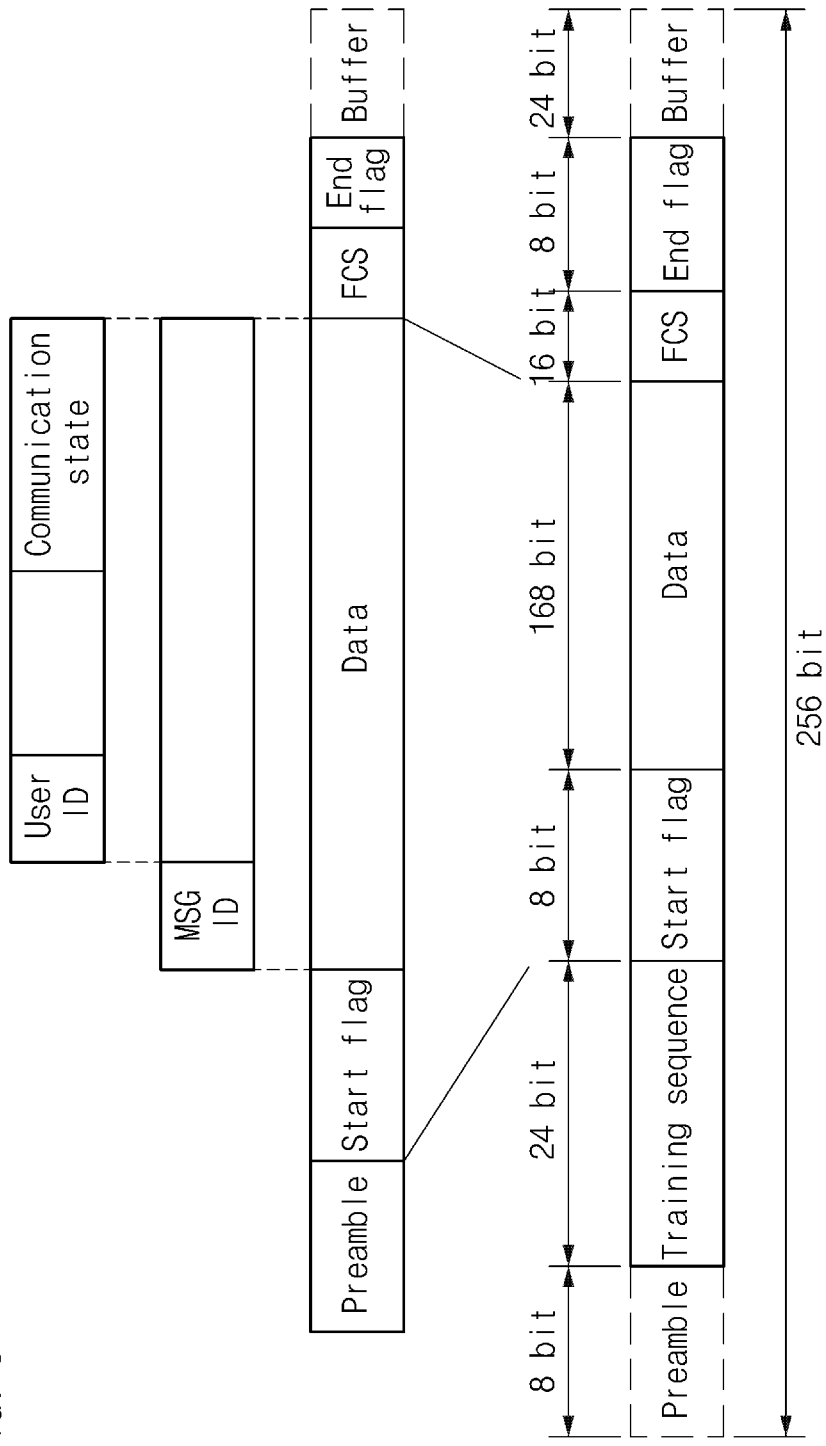
FIG. 3 is a diagram illustrating an example of a data structure for a AIS message in a system for monitoring vessel traffic information according to an embodiment of the present disclosure.

The message of the AIS network may be configured by a structure of FIG. 3. As shown in FIG. 3, the message of the AIS network may be divided into a start flag and a data area. The message ID (MSG ID), the user ID (User ID), and the communication state, and the like may be inserted and stored in the data area. In addition, the sailing condition/rate of turn/ground location accuracy, speed, latitude, longitude, direction of stem, time stamp, preliminary, and flag may be inserted and stored in the data area.

Thus, the interlock device 100 may map the information stored in the message of the ship pass network to the AIS message data to convert into a AIS network message type.

For example, the interlock device 100 may be able to convert the information stored in the message of the ship pass network into a dynamic message of the AIS network message type as shown in the following Table 3.

Referring to Table 3, the interlock device 100 may map and convert the information stored in the ship pass network message, e.g., the speed, the latitude, the longitude, the direction, and the time (UTC) to a parameter of the message of the AIS network message corresponding to the speed, the latitude, the longitude, the direction of stem, and the time-stamp. In addition, the interlock device 100 may adjust the number of bits of the identification system included in the message of the ship pass network to convert into a type suitable for the identification system of the AIS message.

For example, it is possible to convert into the identification system suitable for the AIS message network by adding multi communication information identifier 4 bits to identification system 24 bits of the ship pass network message shown in FIG. 2.

TABLE 3

| AIS parameter | Message conversion method | Note |
| --- | --- | --- |
| Message ID | Use message ID related to location | Identifier |
| Relay station | Not applicable | |
| User ID | Ship pass network multiple communication information identifier (4 bit) + ship pass network terminal identification system 24 bit | Bit setting |

TABLE 3-continued

| AIS parameter | Message conversion method | Note |
| --- | --- | --- |
| Sailing condition/Rate of turn/Ground location accuracy | Not applicable | |
| Speed | Speed | Map data information (latitude, longitude, speed, direction, time, etc) to AIS |
| Latitude | Latitude | |
| Longitude | Longitude | |
| Direction of stem | Direction | |
| Timestamp | UTC | |
| Preliminary | Not applicable | |
| Flag | Not applicable | |
| Communication state | Not applicable | |

In addition, the interlock device 100 may convert the information stored in the message of the ship pass network into a static message of AIS network message type as shown in the following Table 4.

Referring to Table 4, the interlock device 100 may map the information, e.g., speed, latitude, longitude, direction, and time (UTC), and the like stored in the message of the ship pass network to the speed of the AIS message, the latitude, the longitude, the direction of stem, and the timestamp to convert into a AIS message type. In addition, the interlock device 100 may adjust the number of bits of the identification system included in the message of the ship pass network to convert into a type suitable for the identification system of the AIS message.

TABLE 4

| AIS parameter | Message conversion method | Note |
| --- | --- | --- |
| Message ID | Use message ID related to location | Identifier |
| Relay station | Not applicable | |
| User ID | Ship pass network multiple communication information identifier (4 bit) + ship pass network terminal identification system 24 bit | Bit setting |
| Ship name | Input ship name mapped to ship information DB as ship name | |

Thus, the interlock device 100 may convert the message of the ship pass network into a dynamic message and a static message of AIS network message type, and transmit the converted message to a merging device 200.

Although not shown in a drawing, the interlock device 100 may include a communication unit (not shown).

The communication unit may include a communication module for supporting a communication interface with the ship pass (V-Pass) network, the LTEm network, the VDES network, the AIS network, the vessel traffic system (VTS), and the merging device 200 within the VTS, and the like.

Here, the communication module may include a module for wireless internet access or a module for short range communication, and may include a module for wired communication. In this case, a wireless internet technology may include Wireless LAN (WLAN), Wireless Broadband (Wibro), Wi-Fi, World Interoperability for Microwave Access (Wimax), and High Speed Downlink Packet Access (HSDPA) and the like, and a short range communication technology may include Bluetooth, ZigBee, Ultra Wideband (UWB), Radio Frequency Identification (RFID), and Infrared Data Association (IrDA), and the like. Further, a wired communication technology may include a universal serial bus (USB) communication, and the like.

In addition, the interlock device 100 may further include a storage unit (not shown) for storing data and program necessary for the operation of the interlock device 100.

For example, the storage unit may store the setting for the operation of the interlock device 100, and may also store the information converted by the interlock device 100. In addition, the storage unit may store a command for controlling the interlock operation of corresponding traffic information, and may store an algorithm for controlling the conversion and the mapping of various types of maritime traffic information.

Here, the storage unit may include at least one of the storage medium among Flash Memory Type, Hard Disk Type, Multimedia Card Micro Type, a card type memory (e.g., SD or XD memory), a magnetic memory, a magnetic disk, an optical disk, Random Access Memory (RAM), Static Random Access Memory (SRAM), Read-Only Memory (ROM), Programmable Read-Only Memory (PROM), and Electrically Erasable Programmable Read-Only Memory (EEPROM).

Thus, the merging device 200 may merge the data within the AIS message received from the interlock device 100.

For example, the merging device 200 may merge and process the radar image and the location target information of the ship. Furthermore, the merging device 200 may link the radar image, the location target information of the ship, the CCTV image, the sensor information, and/or the AIS information to merge and process, and may transmit merged monitoring information to a monitoring device 300.

The monitoring device 300 may display the monitoring information received from the merging device 200 to an operating console or the like. At this time, the monitoring device 300 may perform a risk determination procedure for the monitoring information received from the merging device 200, and may display the result through a monitoring screen such as the operating console.

Here, the monitoring device 300 may display ship information merged by the merging device 200 and target information detected by other sensors in a different symbol on the monitoring screen. At this time, the monitoring device 300 may compare the location of each symbol with the speed and may determine the risk.

In addition, the monitoring device 300 may automatically track the location of a specific ship among the monitoring information displayed through the monitoring screen such as the operating console, and may display the tracking results.

In other words, the AIS message that the monitoring device 300 received from the interlock device 100 may include identification information of the ship, latitude, longitude, and weather information, etc.

Thus, the monitoring device 300 may extract the identification information and the location target information of the ship included in the AIS message and may determine the location of a specific ship, and may convert a Latitude-Longitude-Height (LLH) coordinate into a coordinate on a radar center coordinate system by using determined location information.

The monitoring device 300 may calculate the location of the target ship on the radar tracking system by using the converted radar coordinate, the speed of the ship, and course information, and the like, and may display the location of a corresponding ship. At this time, the monitoring device 300 may automatically track the location of the ship on the radar tracking system, and may display tracking information on the monitoring screen.

Although not shown in a drawing, the monitoring device 300 may include an input unit and an output unit.

The input unit may be a means for receiving a control instruction from a user, and may correspond to a key button included in the operating console, and may correspond to a soft key implemented on a display unit. In addition, the input unit may be an input means such as a mouse, a joystick, a jog shuttle, a stylus pen, and the like.

The output unit may include a display unit which displays the operating conditions and results of the interlock device 100, and may include a speaker to guide information by voice.

Here, when the display unit is provided with a sensor for detecting a touch operation, it may be used as the input unit as well as the output unit. That is, when a touch sensor such as a touch film, a touch sheet, a touch pad is provided on the display unit, the display unit may operate as a touch screen, and may be implemented in a form of integrating the input unit and the output unit.

At this time, the display unit may include at least one of a liquid crystal display (LCD), a thin film transistor liquid crystal display (TFT LCD), an organic light emitting diode (OLED), a flexible display, a field emission display (FED), and a three-dimensional display (3D display).

In addition, the monitoring device 300 may further include a communication unit (not shown) for supporting a communication interface with the merging device 200 and a storage unit (not shown) for storing data and program necessary for the operation of the monitoring device 300. For example, the storage unit may store the settings for the operation of the monitoring device 300. In addition, the storage unit may store a risk determination algorithm for determining a risk for the merged monitoring information in the monitoring device 300, and may store a tracking algorithm for automatically tracking the location of the ship on the radar tracking system.

The operation flow of the above mentioned monitoring system according to an embodiment of the present disclosure is described in detail.

Figure 4:
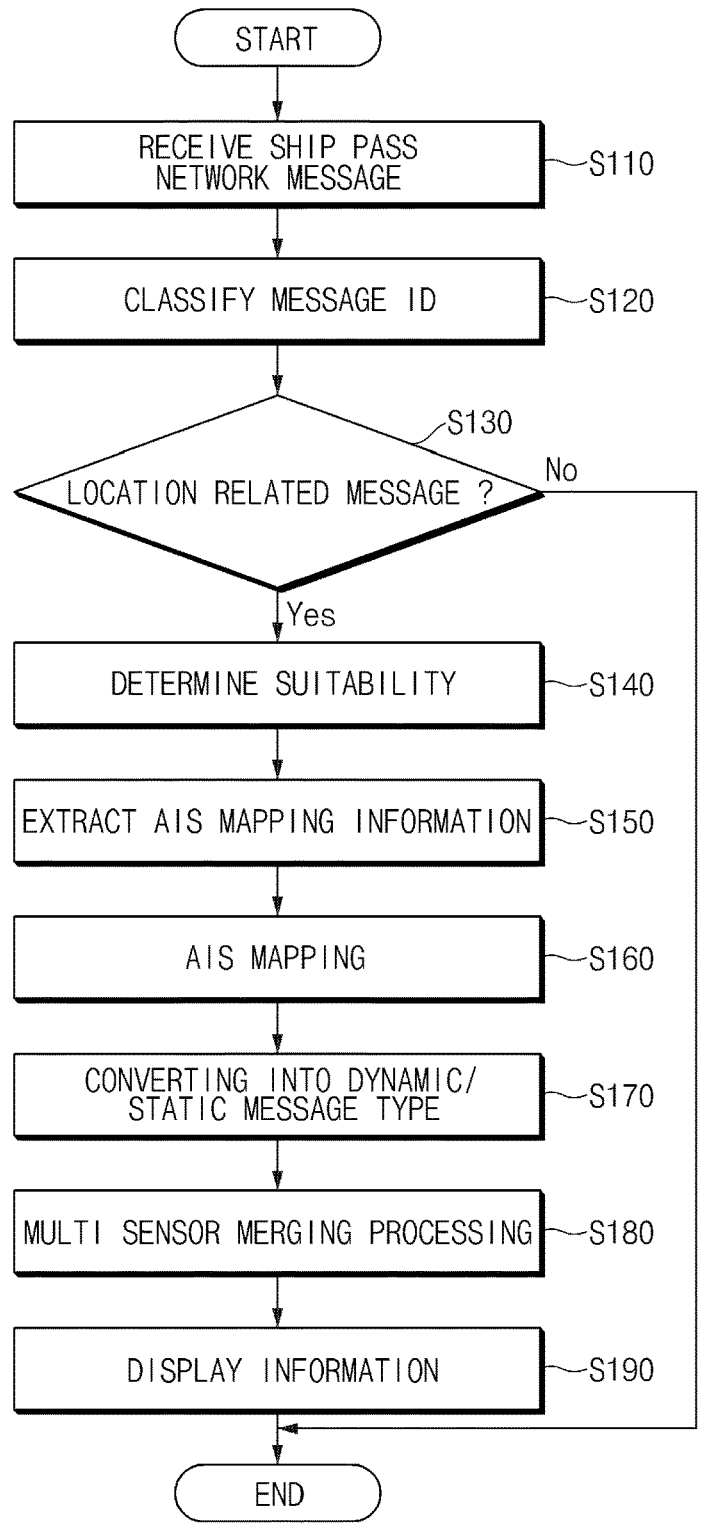
FIG. 4 and FIG. 5 are a flowchart illustrating an operation for a method for monitoring vessel traffic information according to an embodiment of the present disclosure.
Figure 5:
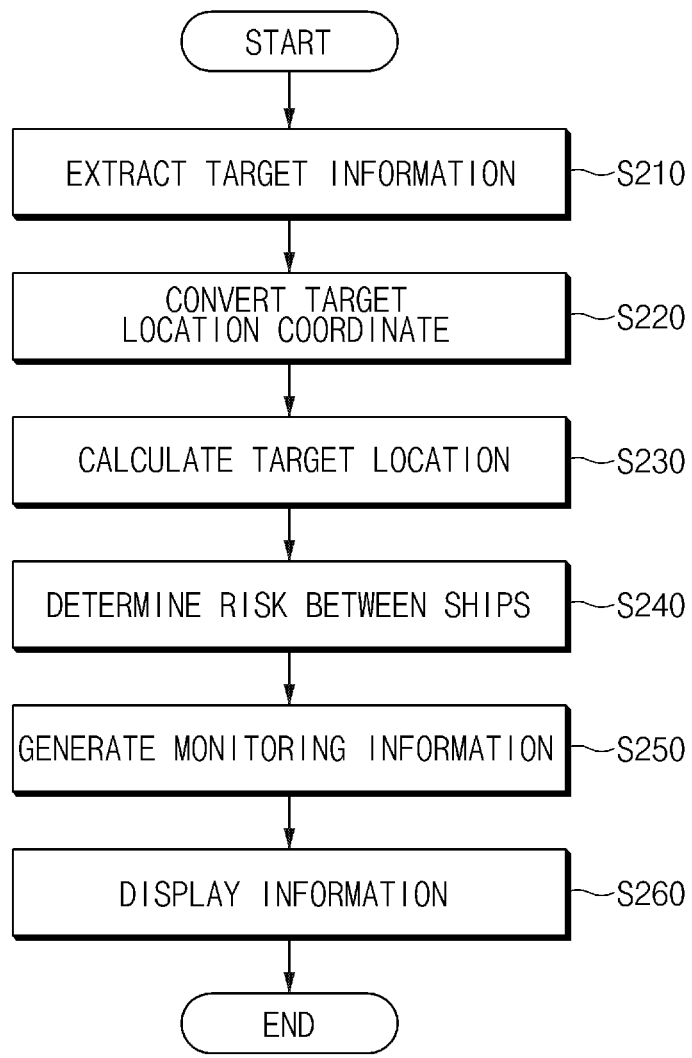

FIG. 4 and FIG. 5 are a flowchart illustrating an operation for a method for monitoring vessel traffic information according to an embodiment of the present disclosure.

First, referring to FIG. 4, the interlock device in the monitoring system may receive a message from the ground base station of the ship pass network (S110). Obviously, the interlock device may receive a message from the ground base station of the LETm network and/or the VDES network as well as the ship pass network.

The interlock device may classify the ID of the message received at operation S110 (S120), and, in case of a location related message (S130), may determine the suitability (S140).

Then, the interlock device may extract the information which can be mapped to the AIS message from the received message of the ship pass network (S150), may map the information extracted at operation S150 to the AIS message (S160), and may generate a dynamic message and a static message (S170).

At operation 'S160', the interlock device may map the information, e.g., the speed, the latitude, longitude, the direction, and the time (UTC), stored in the message of the ship pass network to the parameter of the AIS message corresponding to the speed of the AIS message, the latitude, the longitude, the direction of stem, and the time stamp, and may adjust the number of bits of the message identification system of the ship pass network to convert into the AIS message identification system.

The message generated at operation S170 may be transmitted to the merging device, and, then, the merging device may merge the message generated at operation S170 with the information collected from other sensor network, the radar network, and the like (S180). The monitoring information merged at operation S180 may be transmitted to the monitoring device, and, then, the monitoring device may display the monitoring information received from the monitoring device on the monitoring screen (S190).

Meanwhile, referring to FIG. 5, the monitoring device may extract target information for a specific ship among the monitoring information which is displayed on the monitoring screen at operation S190 of FIG. 4 (S210). At operation S210, the monitoring device may extract the identification information of the ship and the latitude, longitude information, and the like.

The monitoring device may convert a latitude-longitude-height coordinate of a target into a coordinate on the radar center coordinate system based on the target information extracted at operation S210 (S220), and may calculate the location of a ship which is a target in the radar tracking system by using the converted radar coordinate, the speed of the ship, and the course information, and the like (S230).

At this time, the monitoring device may automatically track the location of the ship calculated at operation S230, may compare with the target information generated by other sensors and determine a risk between ships (S240), may generate the monitoring information based on the determination result (S250), and may display the generated monitoring information on the monitoring screen (S260).

The interlock device, the merging device, and the monitoring device may according to an embodiment of the present disclosure that operate as described in the above may be implemented in an independent hardware device type. Meanwhile, the apparatus according to an embodiment of the present disclosure may be included and driven in other hardware device such as a microprocessor or a general purpose computer system as at least one processor.

Figure 6:
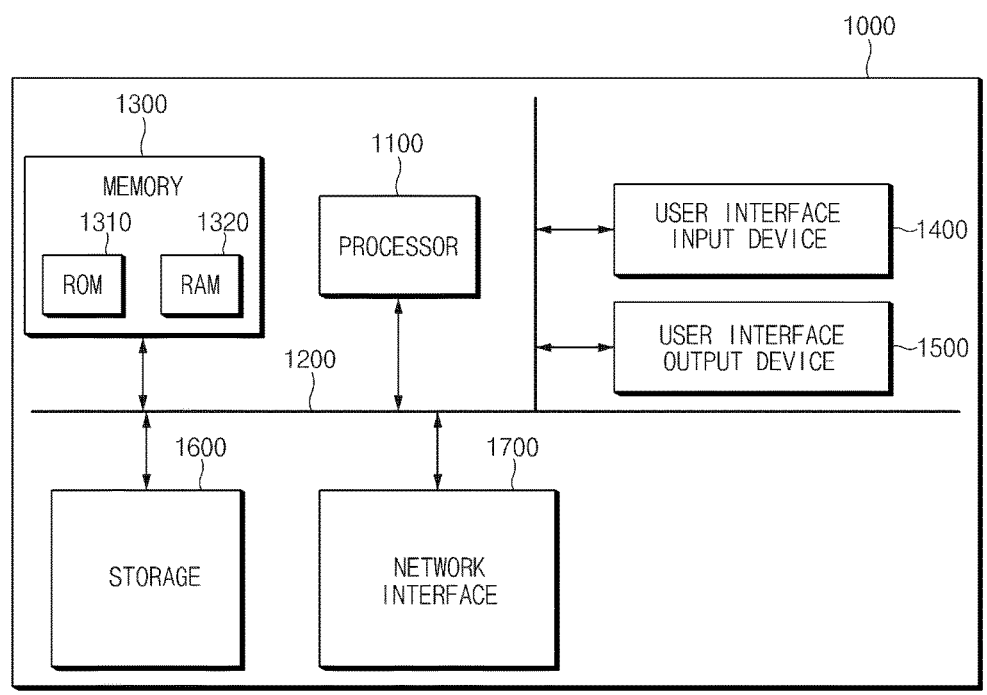
FIG. 6 is a block diagram illustrating a configuration of a computing system implementing an apparatus according to an embodiment of the present disclosure.

FIG. 6 is a block diagram illustrating a configuration of a computing system implementing an apparatus according to an embodiment of the present disclosure.

Referring to FIG. 6, the computing system 1000 may include at least one processor 1100 which is connected via a bus 1200, memory 1300, an user interface input device 1400, an user interface output device 1500, a storage 1600, and a network interface 1700.

The processor 1100 may be a semiconductor device for performing a processing for instructions stored in a central processing unit (CPU) or the memory 1300 and/or the storage 1600. The memory 1300 and the storage 1600 may include various types of volatile and nonvolatile storage media. For example, the memory 1300 may include a Read Only Memory (ROM) 1310 and a Random Access Memory (RAM) 1320. Thus, the steps of the method or the algorithm described in association with the embodiments disclosed herein may be directly implemented by a hardware, a software module, or a combination of the two executed by the processor 1100. The software module may reside in a storage medium (i.e., in the memory 1300 and/or the storage 1600) such as a RAM memory, a flash memory, a ROM memory, an EPROM memory, an EEPROM memory, a register, a hard disk, a removable disk, and CD-ROM. The exemplary storage medium may be coupled to the processor 1100, and the processor 1100 may read information from the storage medium and write information to the storage medium. Alternatively, the storage medium may be integrated in the processor 1100. The processor and the storage medium may reside in an application specific integrated circuit (ASIC). The ASIC may reside in a user terminal. Alternatively, the processor and the storage medium may reside in the user terminal as an individual component.

According to the present disclosure, it is possible to convert prescribed standard type information transmitted from a transmission wireless terminal of a ship efficiently to enable to apply to a conventional monitoring system, and to integrally observe a ship location, additional information, and existing AIS information in a monitoring system and enable to accomplish an individual tracking by matching the GPS based location information of a specific ship with the radar.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for monitoring vessel traffic information, the system comprising at least one processor configured to implement:
   an interlock device configured to adjust identification information of a wireless terminal included in a received message to correspond to an identification system of an auto identification system (AIS) message and convert the received message into an AIS message type, when receiving a message including ship information from a wireless terminal of a ship located in at least one ship network;
   a merging device configured to merge the ship information included in the converted AIS message with radar image information; and
   a monitoring device configured to display merged monitoring information on a monitoring screen.

2. The system of claim 1, wherein the interlock device adjusts a number of bits corresponding to the identification information of the wireless terminal of the ship included in the received message.

3. The system of claim 1, wherein the interlock device extracts information to be mapped to the AIS message among ship information included in the received message when the message received from any one ship network is a location-related message, and generates a dynamic message of the AIS message type by mapping the extracted information.

4. The system of claim 3, wherein the interlock device extracts at least one item of information from among ship speed, latitude, longitude, direction, and time included in the received message, and maps the extracted information to a parameter corresponding to speed, latitude, longitude, direction of stem, and a time stamp of the AIS message.

5. The system of claim 1, wherein the interlock device generates a static message of the AIS message type based on a message ID of the AIS message, a user ID, and a ship name.

6. The system of claim 1, wherein the merging device merges at least one information among information collected by a radar, a closed-circuit television (CCTV), an AIS network, and sensors of another sensor network with the ship information included in the AIS message generated by the interlock device.

7. The system of claim 6, wherein the monitoring device displays information merged by the merging device in a symbol form on the monitoring screen.

8. The system of claim 7, wherein the monitoring device compares a location and a speed of each symbol displayed on the monitoring screen, and determines a risk to the ship.

9. The system of claim 1, wherein the monitoring device extracts identification information of the ship and location information from among monitoring information and determines a location of a specific ship, and converts a latitude-longitude-height (LLH) coordinate into a coordinate on a radar center coordinate system by using determined location information.

10. The system of claim 9, wherein the monitoring device calculates a location of a ship that is a target on a radar tracking system by using a coordinate on a converted radar center coordinate system, a speed of the ship that is the target, and course information, and automatically tracks the location of the ship that is the target on the radar tracking system.

11. A method for monitoring vessel traffic information, the method comprising using at least one processor to perform operations including:
receiving a message including ship information from a wireless terminal of a ship located in at least one ship network, by an interlock device;
adjusting identification information of a wireless terminal included in the received message to correspond to an identification system of an auto identification system (AIS) message and converting the received message into an AIS message type, by the interlock device;
merging the ship information included in the AIS message converted by the interlock device with radar image information, by a merging device; and
displaying monitoring information merged by the merging device on a monitoring screen, by a monitoring device.

12. The method of claim 11, wherein converting the received message into the AIS message type comprises adjusting a number of bits corresponding to the identification information of the wireless terminal of the ship included in the received message.

13. The method of claim 11, wherein converting the received message into the AIS message type comprises:
extracting information to be mapped to the AIS message among ship information included in the received message when the message received from any one ship network is a location related message; and
generating a dynamic message of the AIS message type by mapping the extracted information.

14. The method of claim 13, wherein generating the dynamic message comprises mapping at least one item of information from among ship speed, latitude, longitude, direction, and time extracted from the received message to a parameter corresponding to speed, latitude, longitude, direction of stem, and a time stamp of the AIS message.

15. The method of claim 11, wherein converting the received message into a AIS message type comprises generating a static message of the AIS message type based on a message ID of the AIS message, a user ID, and a ship name.

16. The method of claim 11, wherein merging the ship information included in the AIS message comprises merging at least one item of information among information collected by a radar, a closed-circuit television (CCTV), an AIS network, and sensors of another sensor network with the ship information included in the AIS message generated by the interlock device.

17. The method of claim 16, wherein displaying monitoring information comprises displaying information merged by the merging device in a symbol form on the monitoring screen.

18. The method of claim 17, further comprising, by the monitoring device, comparing a location and a speed of each symbol displayed on the monitoring screen, and determining a risk to the ship.

19. The method of claim 11, wherein the displaying monitoring information comprises extracting identification information of the ship and location information from among monitoring information and determining a location of a specific ship, and converting a latitude-longitude-height (LLH) coordinate into a coordinate on a radar center coordinate system by using determined location information.

20. The method of claim 19, wherein the monitoring device calculates a location of a ship that is a target on a radar tracking system by using a coordinate on a converted radar center coordinate system, a speed of the ship that is the target, and course information, and automatically tracks the location of the ship that is the target on the radar tracking system.

* * * * *